United States Patent [19]

Okajima et al.

[11] Patent Number: 5,067,455
[45] Date of Patent: Nov. 26, 1991

[54] METHOD AND APPARATUS FOR ADDING ADDITIVES TO LUBRICATING OIL

[75] Inventors: Atsushi Okajima, Kariya; Yasuou Yamazaki; Yasuhide Okamoto, both of Nagoya; Masaei Nozawa, Okazaki; Yukihisa Takeuchi, Chita; Hajime Akado, Anjo, all of Japan

[73] Assignee: Nippondenso Co., Ltd., Kariya, Japan

[21] Appl. No.: 605,853

[22] Filed: Oct. 31, 1990

[30] Foreign Application Priority Data

Nov. 4, 1989 [JP] Japan .................................. 1-287739
Oct. 4, 1990 [JP] Japan .................................. 2-267787

[51] Int. Cl.$^5$ ............................................. F01M 9/02
[52] U.S. Cl. ............................ 123/196 R; 123/196 M; 340/438; 73/64
[58] Field of Search ................... 340/450.3, 603, 438; 123/196 R, 196 M; 73/64

[56] References Cited

U.S. PATENT DOCUMENTS

| | | | |
|---|---|---|---|
| 2,302,552 | 11/1942 | Johnson | 123/196 A |
| 2,435,707 | 2/1948 | Bray et al. | 252/326 |
| 2,898,902 | 8/1959 | Vogel | 123/196 S |
| 3,314,884 | 4/1967 | Cover | 252/10 |
| 4,497,200 | 2/1985 | Tournier | 340/438 |
| 4,506,337 | 3/1985 | Yasuhara | 340/438 |
| 4,629,334 | 12/1986 | Hochstein | 73/64 |
| 4,733,556 | 3/1988 | Meitzler et al. | 73/64 |
| 4,741,204 | 5/1988 | Luck et al. | 73/64 |
| 4,792,791 | 12/1988 | Cipris et al. | 340/438 |

FOREIGN PATENT DOCUMENTS

| | | |
|---|---|---|
| 2600503 | 7/1977 | Fed. Rep. of Germany .... 340/52 R |
| 52-110376 | 2/1977 | Japan . |
| 0146995 | 9/1982 | Japan .................................. 340/438 |
| 59-96413 | 6/1984 | Japan . |
| 59-162444 | 9/1984 | Japan . |
| 61-4516 | 1/1986 | Japan . |
| 63-94014 | 4/1988 | Japan . |

Primary Examiner—Willis R. Wolfe
Assistant Examiner—Erick Solis
Attorney, Agent, or Firm—Cushman, Darby & Cushman

[57] ABSTRACT

Additive is supplied to the lubricating oil by an additive supplying pump according to TBN of the lubricating oil which is detected by a TBN sensor which detects the current produced by the impressed voltage. TBN is kept between 0 and 2.

14 Claims, 17 Drawing Sheets

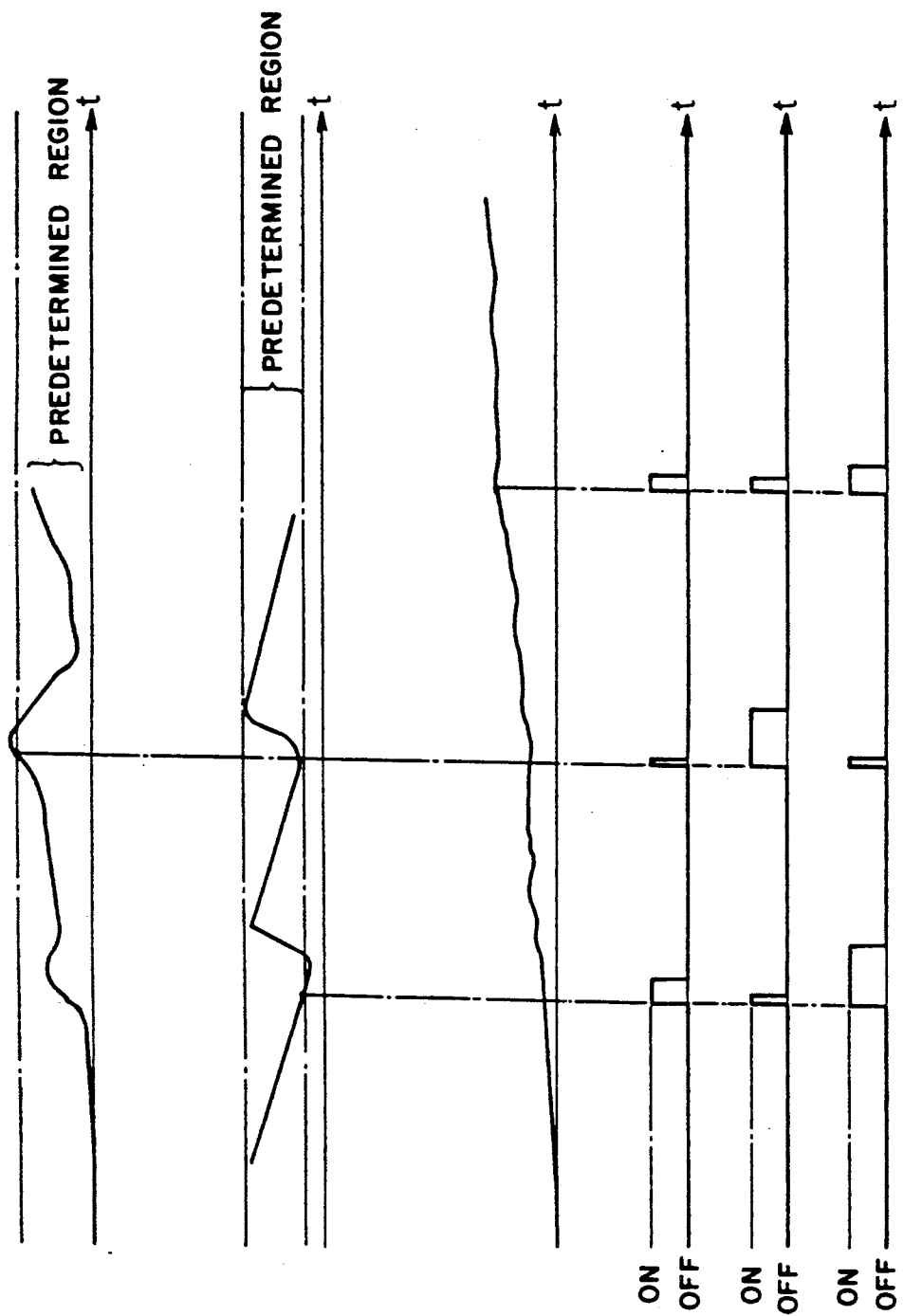

METHOD AND APPARATUS FOR ADDING ADDITIVES TO LUBRICATING OIL

BACKGROUND OF THE INVENTION

The present invention relates to a detergent apparatus for lubricating oil and more particularly, to a detergent apparatus for lubricating oil of an internal combustion engine or the like.

Most lubricating oil for internal combustion engines include many kinds of additives to protect against deterioration. U.S. Pat. No. 2,898,902 shows to supply a predetermined amount of additives to the lubricating system every time the starter is actuated. When using this related art, however, a problem will exist that the deterioration rate will change by the driving condition. Because of this change of deterioration rate, adequate maintenance of the oil is not possible.

Many attempts have been made in the prior art to adequately maintain the additive level and condition of lubricating oil, but none of these have been successful. For example, U.S. Pat. No. 2,898,902 shows an apparatus for supplying additives to lubricating system which supplies additives when an electric starter is actuated. Japanese unexamined publication 63-94014, 52-110376 and 59-162444 show some detectors which detect a deterioration of the lubricating oil determined by detected current. U.S. Pat. No. 2,435,707 shows an apparatus for treating oil which has a filtering medium for filtering out the agglomerated impurities. U.S. Pat. No. 2,302,552 shows an apparatus for treating oil which has a porous absorbent material impregnated with an addition agent to compensate for the loss of agent in the oil during use. Japanese unexamined publication 59-96413 shows an additive supplying apparatus which supplies additives to an oil pan by an rotational oil pump cooperated by an internal combustion engine.

The sensors shown in Japanese unexamined publication 63-94014, 52-110376 and 59-162444 can not detect the correct deterioration when a temperature of the oil changes. Other related arts also can not decide an adequate amount of additives.

BRIEF SUMMARY OF THE INVENTION

The present invention overcomes these problems by providing system that more thoroughly maintains the condition of the oil.

One of the objects of the present invention is to provide a method and an apparatus for adding additives to lubricating oil which can supply additives automatically to reduce the necessary amount of maintenance of the lubricating oil.

It is another object of the present invention to remove insoluble components and refine the lubricating oil.

The deterioration of the lubricating oil of the internal combustion engine is caused by both blowby gas deterioration and thermal degradation. The blowby gas deterioration is caused by blowby gas having $NO_8$, partially burnt gasoline and etc. The thermal degradation is caused by the thermal deterioration of the lubricating oil. Measures of the characteristics of the deterioration of the lubricating oil are known as TBN, TAN, insoluble components number and etc.

As the lubricating oil deteriorates, TBN, TAN, and insoluble components number become nonstandard respectively. TBN is an abbreviation of Total Basic Number which defines the chemical equivalent of KOH in milligrams to HCl(hydro -chloric acid) or $HClO_4$(p-erchloric acid) to neutralize the total basic components included in 1 gram of sample, as shown in Japanese standard JISK250 1. TBN is also called 'neutralization number'.

TAN is an abbreviation for Total Acid Number which defines the equivalent weight of KOH in milligrams to neutralize the total acid components included in 1 gram of sample.

Insoluble components define the weight (%) of pentane insoluble components as shown in Japanese standard JPI-5S-18. TBN determines the ability of the detergent additive. TAN determines the thermal degradation of the lubricating oil. Insoluble components are produced by the blowby gas deterioration and the thermal degradation, and provides a measure of the total deterioration of the lubricating oil.

In the present invention, a detecting means detects TBN of the lubricating oil by detecting current in the lubricating oil produced by an impressed voltage. Controlling means controls supplying means which supplies additives to the lubricating oil, according to the detected TBN.

Furthermore, supplying means is controlled by controlling means to keep the TBN between 0 and 2.

Separating agent adding means supplies the separating agent including the flocculating agent or the tackiness agent to separate insoluble components from the lubricating oil. The separated insoluble components are filtered by filtering means. Adsorbing means adsorbs over supplied separating agent.

BRIEF DESCRIPTION OF THE DRAWINGS

FIG. 20 shows a time chart of the third embodiment of the present invention.

DETAILED DESCRIPTION OF THE PREFERRED EMBODIMENT

Figure 1:
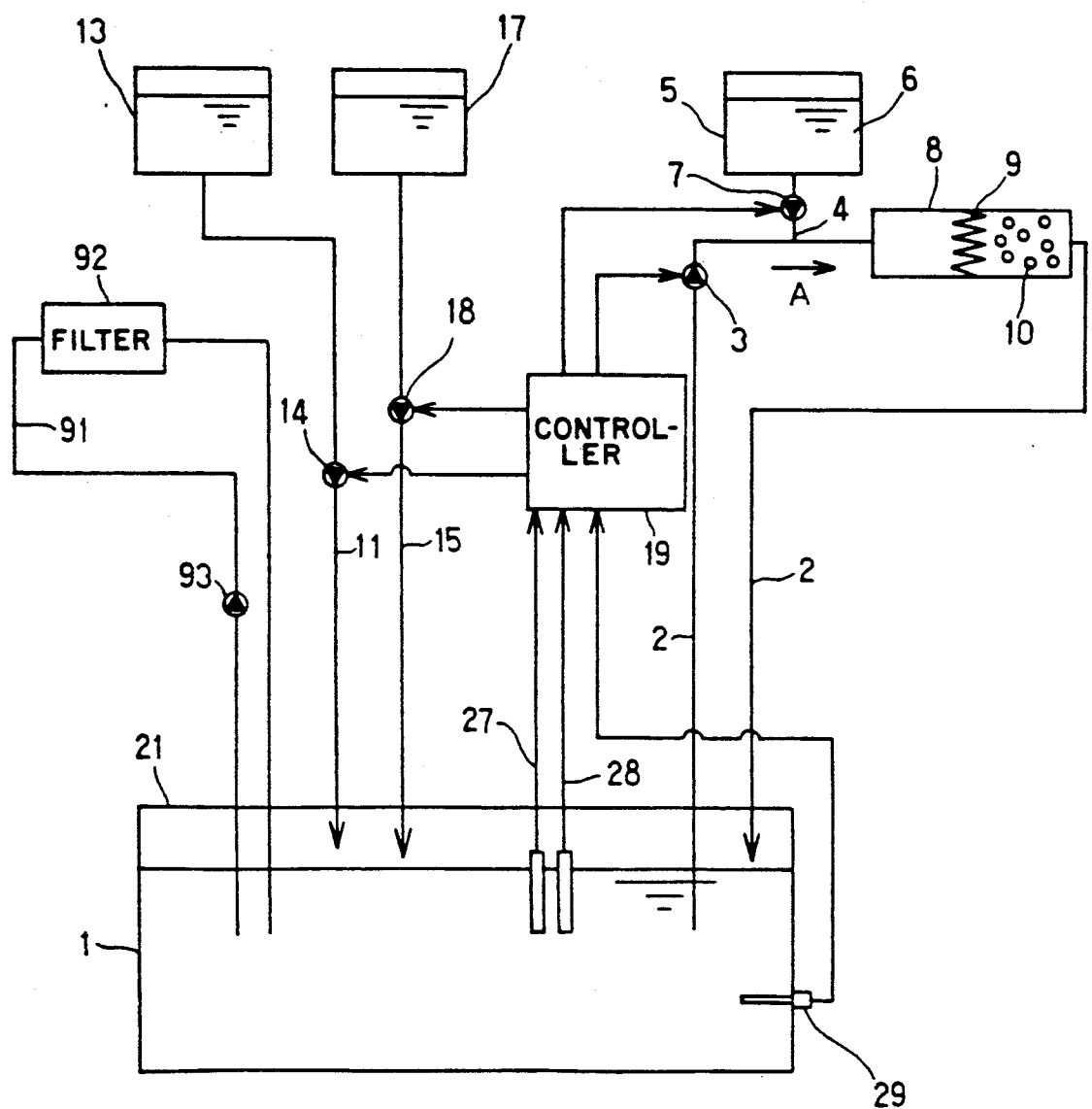
FIG. 1 is a schematic view showing the overall constraction of the first embodiment of the present invention.

FIG. 1 is a schematic view showing the overall constraction of the first embodiment which is applied to an internal combustion engine of an automobile. In this first embodiment of the present invention, pump 93 and pipe 91 are equipped for sending lubricating oil in oil pan 1 to the engine (not shown). Filter 92 is used to filter impurities in the lubricating oil. The lubricating oil is SG-grade engine oil on API (American Petroleum Institute) classification. The tank 13 for the lubricating oil is made of polypropylene and has a volume of 2 liters. The tank 13 for lubricating oil is connected to oil pan 1 by pipe 11, pump 14 and head cover 21. This tank 13 for lubricating oil has lubricating oil containing additives. Pump 14 can supply lubricating oil from tank 13 for lubricating oil to oil pan 1. Tank 17 for additives made of polypropylene and has a volume of 500 cc. Tank 17 for additives has additives containing antioxidant, detergent oil and etc. Additive supplying pump 18 is equipped in pipe 15 as supplying means, and can supply additives from tank 17 for additives to oil pan 1.

Oil pan 1 and pipe 2 form the circulating path of the lubricating oil. Rotational oil pump 3, which has a discharge capacity of 2~30 cc/hr, is controlled by an intermittent timer, and is equipped in pipe 2. In FIG. 1, lubricating oil circulates in the direction of arrow A when oil pump 3 is driven. Tank 5 for flocculating agent has a volume of 500 cc. It is formed of polypropylene and is connected to pipe 2 below oil pump 3 by branch pipe 4 and flocculating agent supplying pump 7. Tank 5 for flocculating agent has a flocculating agent 6 which is used as a separating agent which separates insoluble components from oil by making them big enough to be filtered out. In the preferred embodiment, the flocculating agent 6 is N-n butyl diethanol-amine. Flocculating agent supplying pump 7 has a discharge capacity of 0.1~1 cc/hr, is controlled by an intermittent timer driven by 12 V D. C. Flocculating agent supplying pump 7 can be a rotational pump or a tube pump.

Cylindrical case 8 holds a filter 9 and adsorbent 10 for removing flocculated components and removing excess flocculating agent. Case 8 is equipped below the connection of pipe 2 and branch pipe 4. Cylindrical case 8 is 90 mm in diameter and 100 mm in length. Filter 9 is equipped in cylindrical case 8. Adsorbent 10 is filled in incylindrical case 8 to remove the components below filter 9. Filter 9 is made by high temperature fiber with phenol resin, having 300 cm$^2$ of filtering area and with 10 μm diameter pores. Porous adsorbent 10 is chosen from montmorillonite, for example, an activated clay or molecular sieves with 10~100Å diameter pores. Oil level sensor 28 which is of a float type with some limit switches is formed of stainless steel. Oil level sensor 28 detects whether the oil is at the upper-level, the middle-level or the lower-level.

Figure 2:
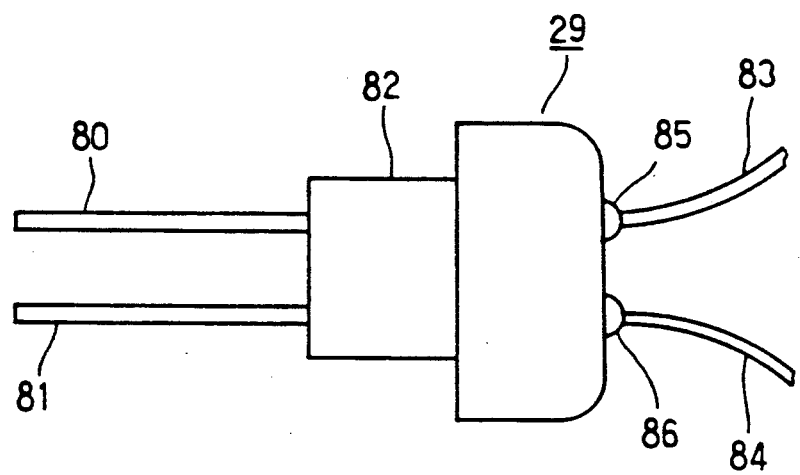
FIG. 2 is a front view showing the construction of detecting means of the first embodiment of the present invention.
Figure 3:
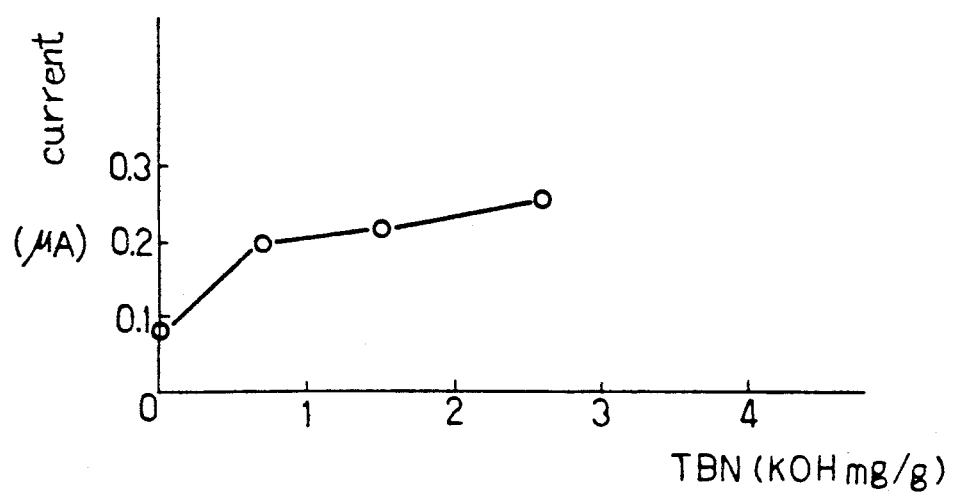
FIG. 3 is a view showing the relationship between the TBN and the current of the lubricating oil.

TBN sensor 29 as detecting means and insoluble components detecting sensor 27 are equipped in oil pan 1. The detailed construction of TBN sensor 29 is shown in FIG. 2. Copper wire 80 and 81 of 1 mm in diameter are soaked in the lubricant oil in oil pan 1, and held by resin-housing 82. Leads 83 and 84 connected to copper wire 80 and 81 are attached to resin-housing 82 by soft solder joints 85 and 86. The value of TBN is determined from a previously known relationship between TBN and current when a high voltage is impressed between copper wire 80 and 81. A representative relationship between TBN and current when 5 kv of voltage was impressed, is shown in FIG. 3.

The detection of the density of insoluble components is carried out by a light-emitting diode and a silicon photo diode, using the principle that the transmittance becomes lower as the density of insoluble components becomes higher.

Pipe 2 is made by heat-resistant stainless steel. Branch pipe 4 comprises a silicon tube or a Teflon tube of 2 mm~5 mm in diameter. Pumps 3, 7, 14 and 18 are controlled by controller 19 as controlling means.

Figure 4A:
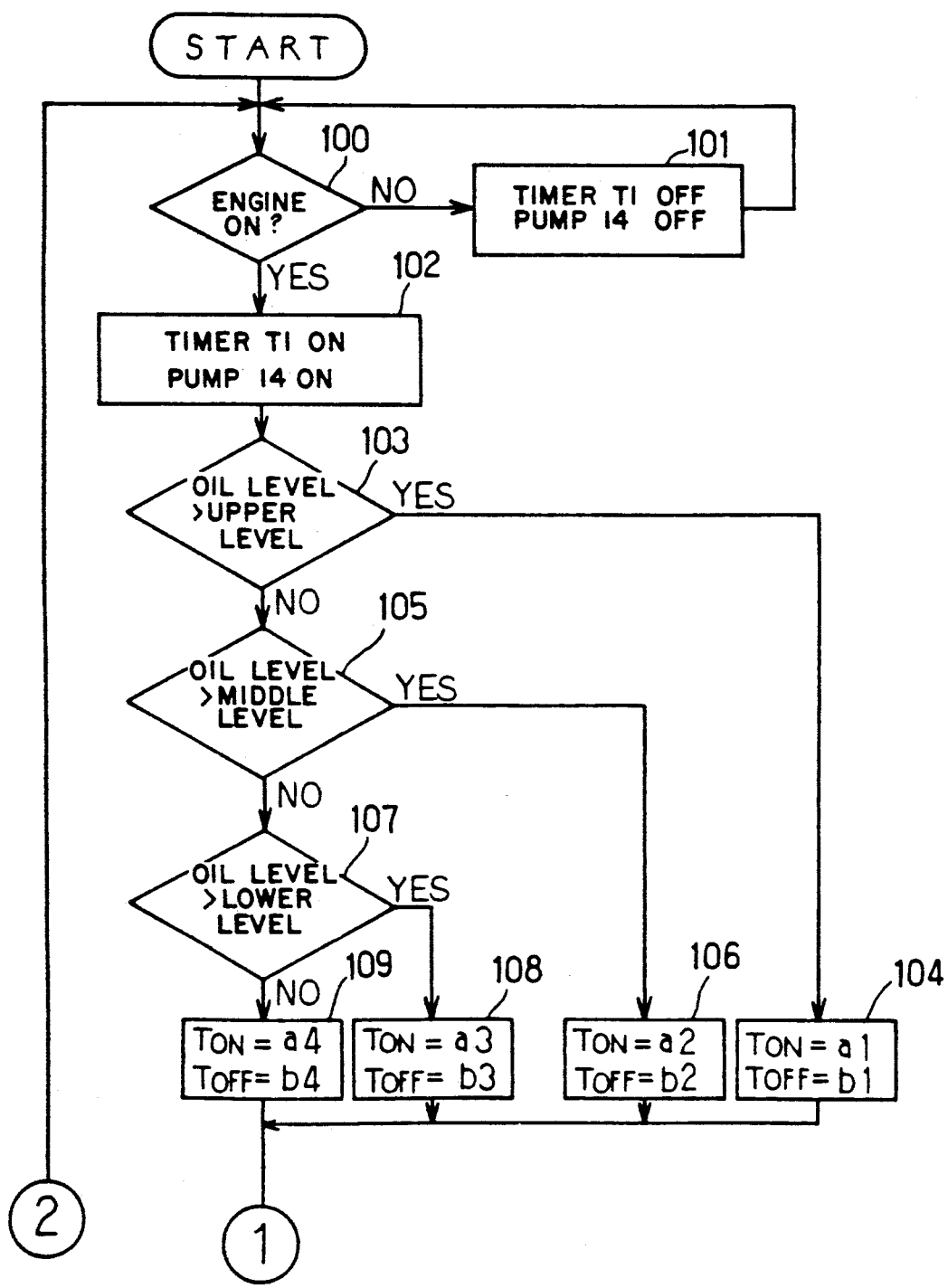
FIG. 4a and 4b shows a flow chart of the first embodiment of the present invention.
Figure 4B:
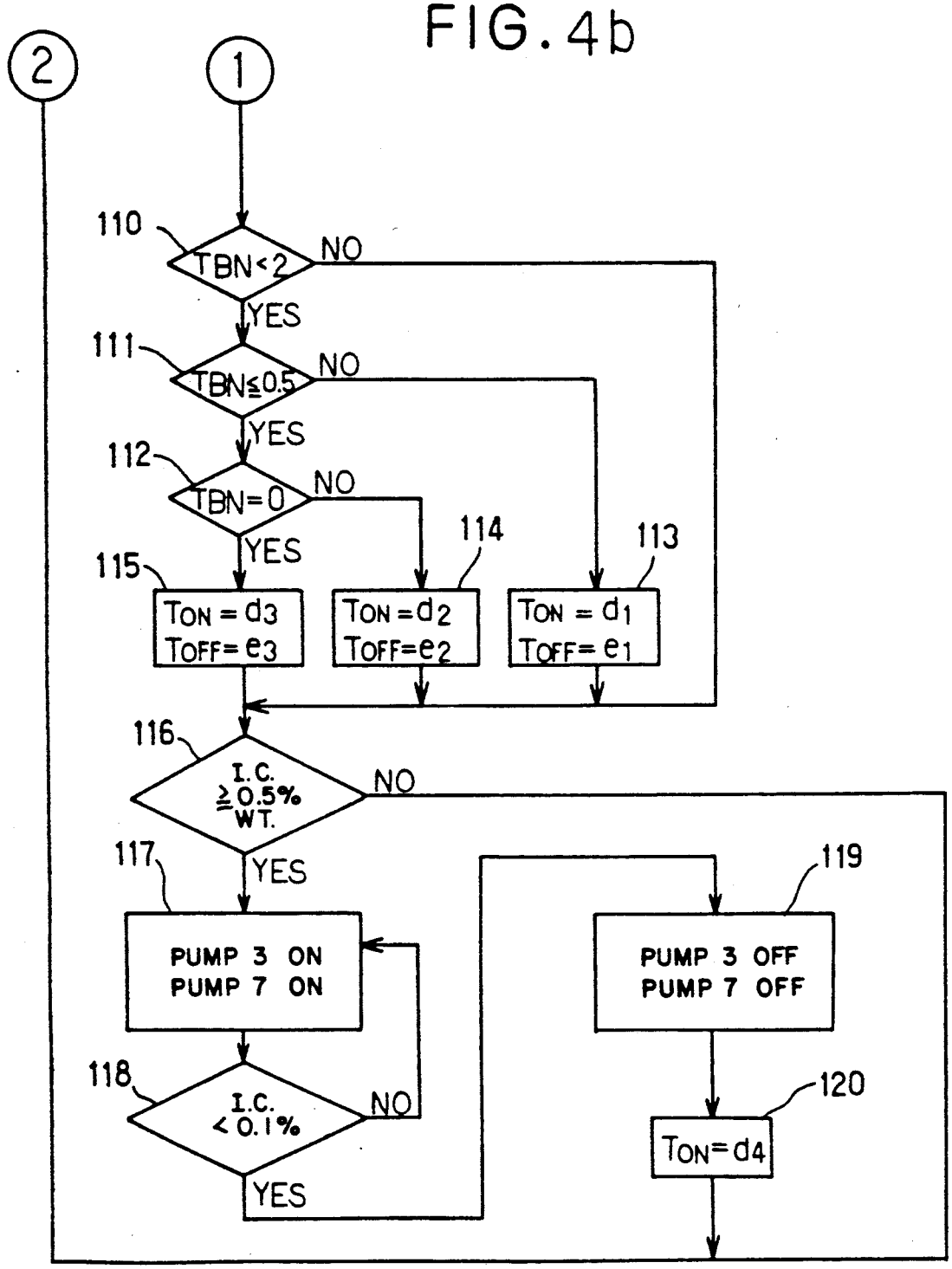
Figure 5:
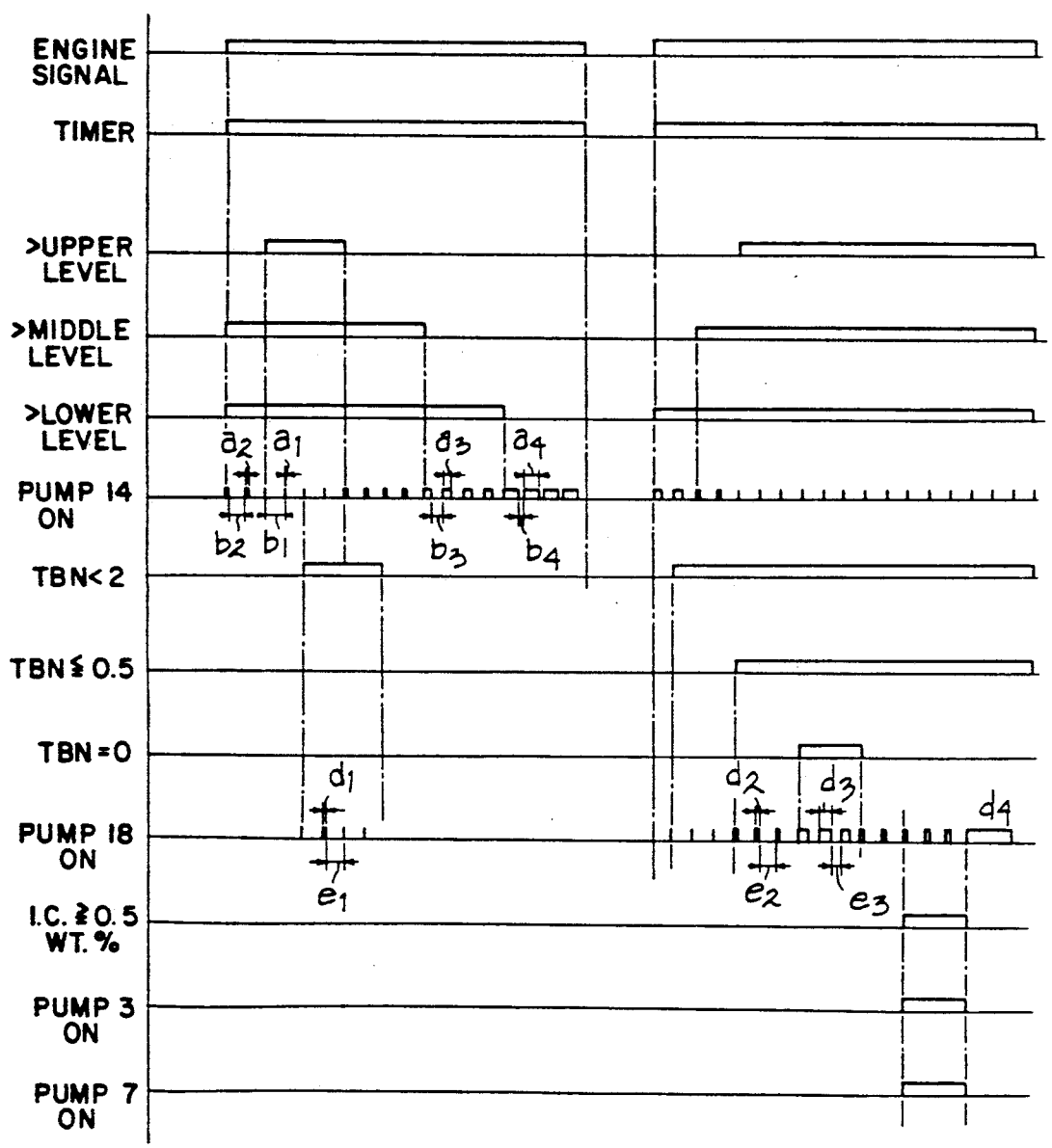
FIG. 5 shows a time chart of the first embodiment of the present invention.

The operation of the first embodiment is described below referring to FIG. 4 and FIG. 5.

Step 100 determines whether the engine is driving or not by an operational signal from key switch(ignition switch). If the engine is not driving, controller 19 turns off an intermittent timer T1 and lubricating oil supplying pump 14 in a step 101. If the engine is driving, controller 19 turns on the intermittent timer T1 and lubricating oil supplying pump 14 in a step 102. Step 103, determines if a level of the lubricating oil is higher than the predetermined upper level or not based on a signal of oil level sensor 28. When the level is higher than the upper level, step 104 is executed which sets the on-time $t_{on}$ and off-time $t_{off}$ of lubricating oil supplying pump 14 to a1 and b1 respectively as shown in FIG. 5. When the level is lower than the upper level. Step 105 determines whether a level of the lubricating oil is higher than the predetermined middle level or not from a signal of oil level sensor 28. When the level is between the upper level and the middle level, in a step 108, on-time $t_{on}$ and off-time $t_{off}$ of lubricating oil supplying pump 14 are set to a2 and b2 respectively as shown in FIG. 5. When the level is lower than the middle level, in a step 107, a level of the lubricating oil is judged to determine whether the level is higher than the predetermined lower level or not from a signal of oil level sensor 28. When the level is higher than the lower level, in a step 108, on-time $t_{on}$ and off-time $t_{off}$ of lubricating oil supplying pump 14 are set to a3 and b3 respectively as shown in FIG. 5. When the level is lower than the lower level, in a step 109. on-time $t_{on}$ and off-time $t_{off}$ are set to a4 and b4 respectively as shown in FIG. 5 by controller 19. In the first embodiment, on-time $t_{on}$ and off-time $t_{off}$ are set as (a1/b1)<(a2/b2)<(a3/b3)<(a4/b4). Step 110, determines whether the value of TBN is smaller than 2 or not. If TBN is greater than or equal to 2, additive supplying pump 18 stops supplying additives and a step 116 is carried out. If TBN is smaller than 2 in the step 110, a step 111 is carried out to determine whether or not TBN is smaller than or equal to 0.5. If TBN is greater than 0.5 in the step 111, a step 113 is carried out to set on-time $t_{on}$ and off-time $t_{off}$ of additive supplying pump 18 to d1 and e1 respectively as shown in FIG. 5. If TBN is smaller than or equal to 0.5 in the step 111, a step 112 is executed to determine whether TBN is equal to 0. If TBN is greater than 0 in the step 112, a step 114 is carried out to set on-time $t_{on}$ and off-time $t_{off}$ of additive supplying pump 18 to d2 and e2 respectively as shown in FIG. 5. If TBN is equal to 0 in the step 112, a step 115 is carried out to set on-time $t_{on}$ and off-time $t_{off}$ of additive supplying pump 18 to d3 and e3 respectively as shown in FIG. 5. On-time $t_{on}$ and off-time $t_{off}$ of additive supplying pump 18 are set to satisfy (d1/e1)<(d2/e2)<(d3/e3).

Step 116 determines whether or not insoluble components are greater than or equal to 0.5 wt %. If insoluble components are smaller than 0.5 wt % in the step 116, the flow of the operation of the first embodiment returns to the step 100. If insoluble components are greater than or equal to 0.5 wt %, a step 117 is executed to drive rotational oil pump 3 and flocculating agent supplying pump 7 to circulate lubricating oil and to supply flocculating agent to the lubricating oil. The amount of the circulation is controlled so that circulation time for one circulation is longer than 2 hours. The amount of supply of the flocculating agent 6 in the step 117 is about 1~3% of lubricant oil. This flocculating agent 6 makes the insoluble components bigger by flocculating insoluble components in the lubricant oil. These bigger components are then filtered out. Insoluble components with a size of about 100 Å include a nitride polymer produced by blowby gas deterioration. a hydrocarbon polymer produced by thermal degradation and a carbon in the blowby gas. These components are flocculated, to form particles with the size of 10~100 μm. Then, these particles of insoluble components are filtered by filter 9. The excess flocculating agent which does not flocculate insoluble components is adsorbed by adsorbent 10, to prevent an excess of the flocculating agent from flowing into oil pan 1.

Step 118 determines whether insoluble components are smaller than 0.1 wt % or not. If insoluble components are greater than or equal to 0.1 wt % in the step 118, the operation of step 117 is repeated. If insoluble components are smaller than 0.1 wt % in the step 118, steps 119 and 120 are executed respectively. In the step 119, the drive of rotational oil pump 3 and flocculating agent supplying pump 7 are stopped (turned off). In the step 120, additive supplying pump 18 supplies additives by controlling on-time $t_{on} = d4$ for lack of additives caused by adsorbent 10.

TBN is controlled to be greater than 0 because there is a sudden increase of insoluble components and of TAN when TBN turns 0. This is undesirable because the ability to neutralize acid and to disperse small particles decline when TBN turns 0.

Figure 6:
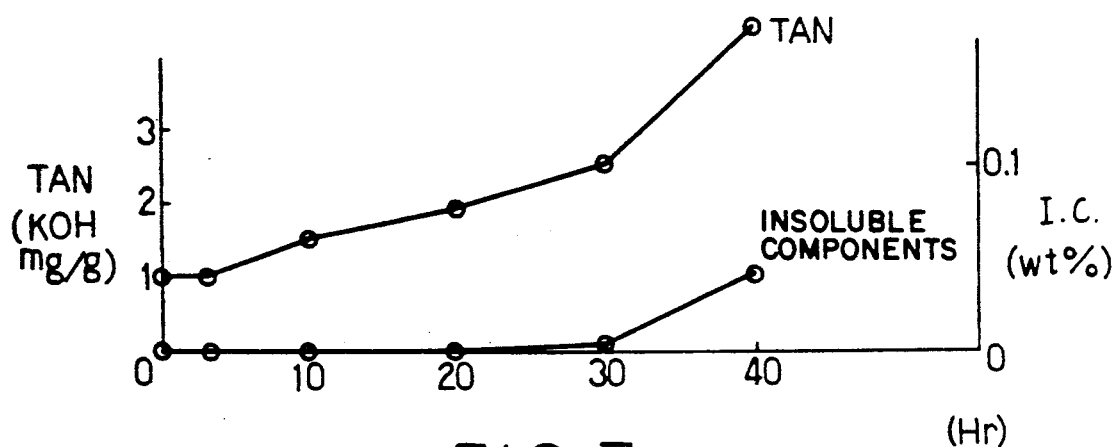
FIG. 6 is a graphic view showing the relationship between TAN, insoluble components and the deterioration of the lubricating oil.
Figure 7:
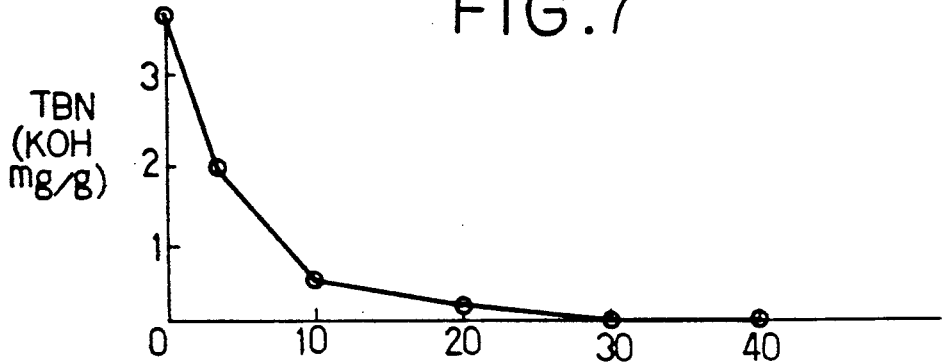
FIG. 7 is a graphic view showing the relationship between TBN and the deterioration of the lubricating oil.
Figure 8:
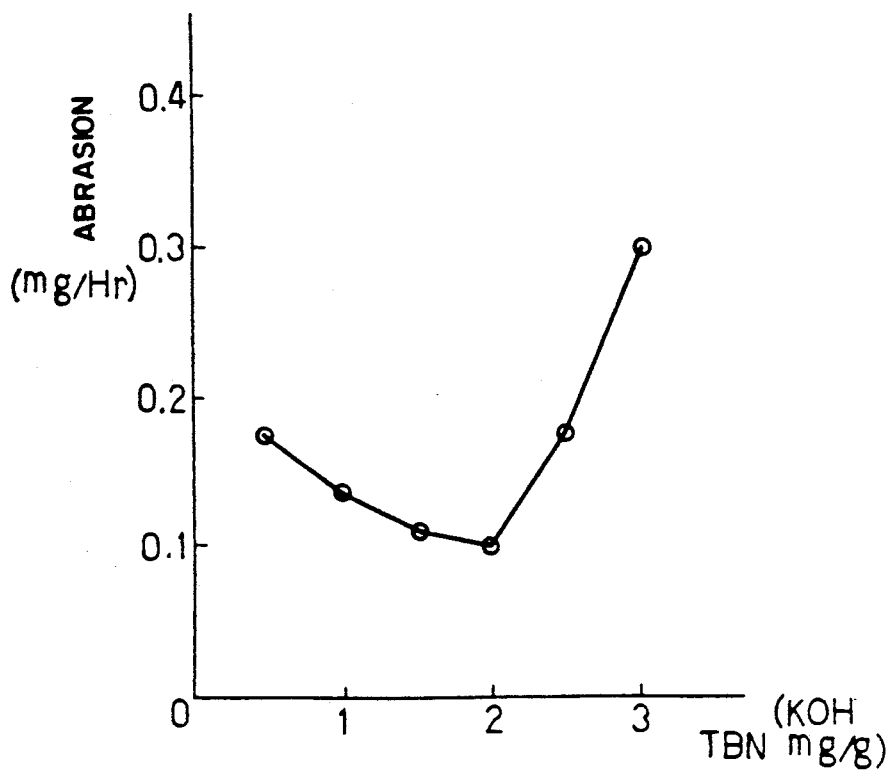
FIG. 8 is a graphic view showing the relationship between TBN and the abrasion of the engine.

The reason for controlling TBN to be smaller than 2 is that the abrasion quantity of the engine increases when TBN is greater than 2, as shown in FIG. 8 which shows the relationship between TBN and the abrasion quantity. In FIG. 6 and FIG. 7, these data are taken when the temperature of the lubricant oil is 140° C. The data of FIG. 8 are calculated from quantity of weight change by using samples of wear using the so-called four-ball test(which is described in U.S. Pat. No. 3,314,884), after adding an additive with a calcium phosphate as a main component to the deteriorated oil which was used for a car with more than 5000 km running.

Figure 9:
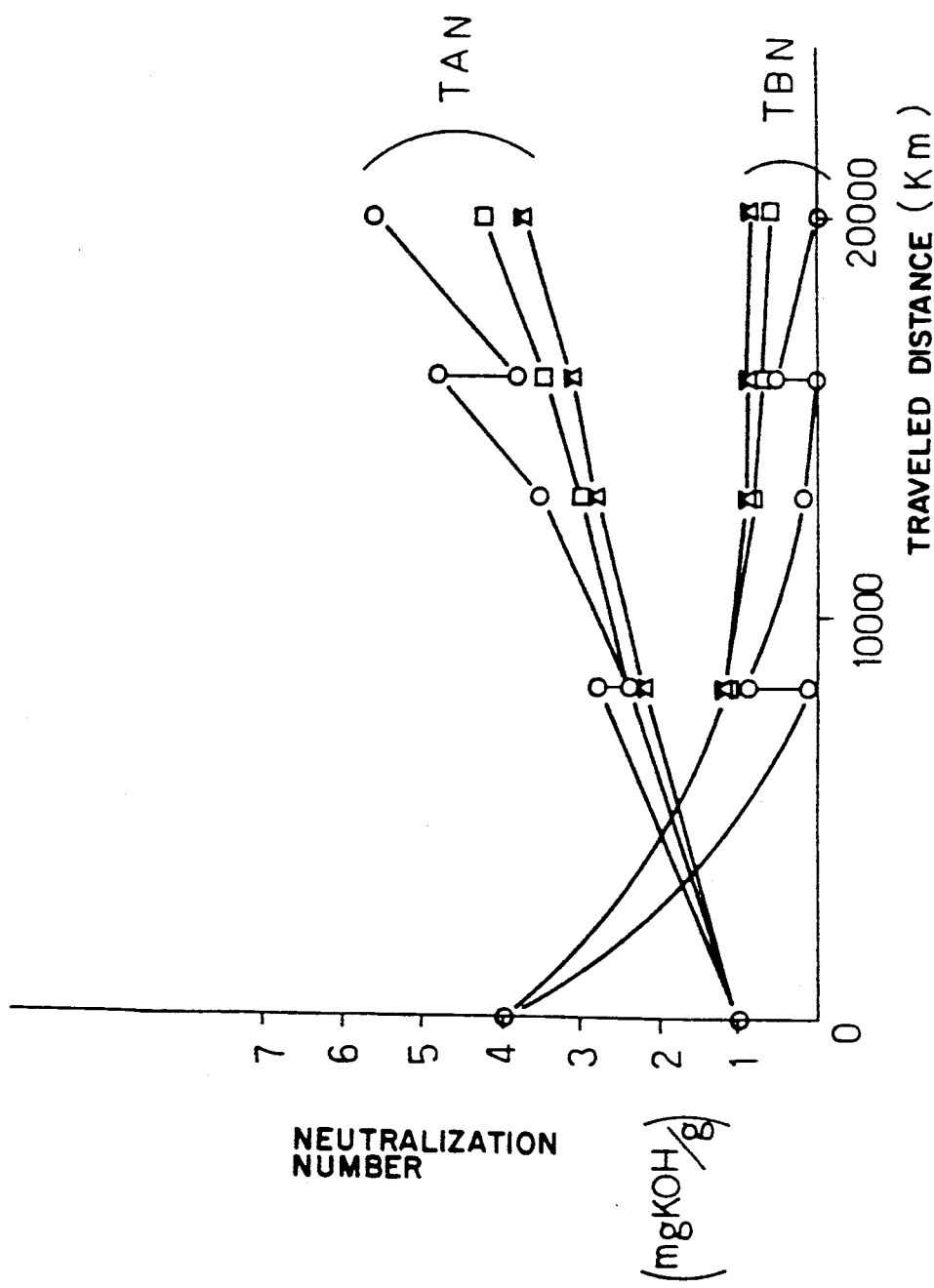
FIG. 9 to FIG. 14 are graphic views showing the experimental data to prove the effect of the first embodiment of the present invention.
Figure 10:
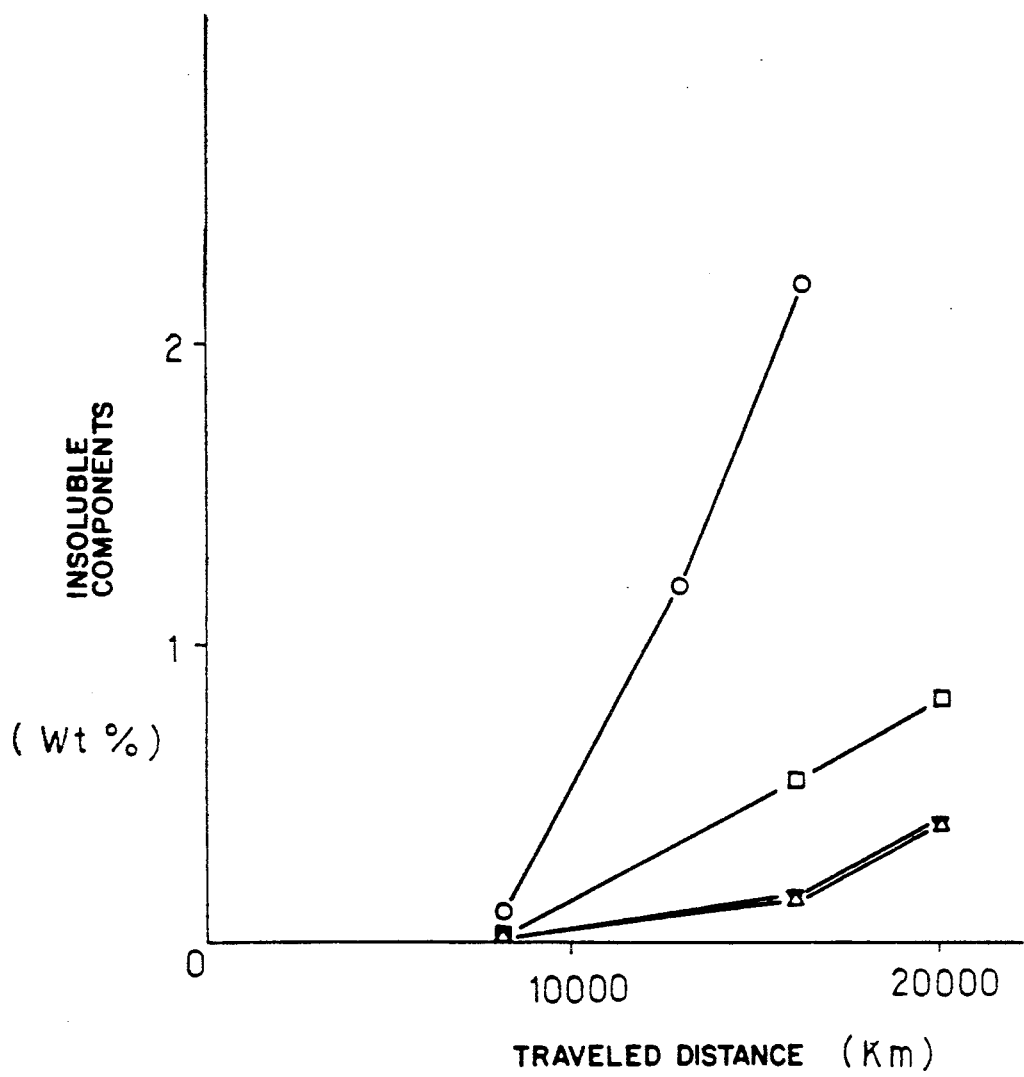

Some experimental data were taken to prove the effect of the first embodiment. The experimental results of the lubricating oil used for a running car when 0.075 cc of lubricant oil including additives was supplied every 600 m, 0.5 cc of lubricant oil including additives was supplied every 4 km, 50 cc of lubricant oil including additives was supplied every 400 km and 1 liter of lubricant oil including additives was supplied every 8000 km are shown in FIG. 9 and FIG. 10. These results show that a shorter term of supplying lubricant oil is better for supplying the same total amount of lubricant oil.

In other words, continuous supplying of lubricant oil is better than an intermittent supplying of lubricant oil for keeping TBN, TAN and insoluble components within a desireble range to prolong a life of lubricant oil. However, characteristics of actual pump make it difficult to continuously supply the oil. The inventor has found that the effect of supplying lubricating oil at less than 0.3 cc per one supplying is almost the same to that of 0.3 cc supply of lubricating oil.

It is difficult to keep TBN within range only by supplying lubricating oil. Therefore, the rate of adding additives are also controlled in the first embodiment.

Figure 11:
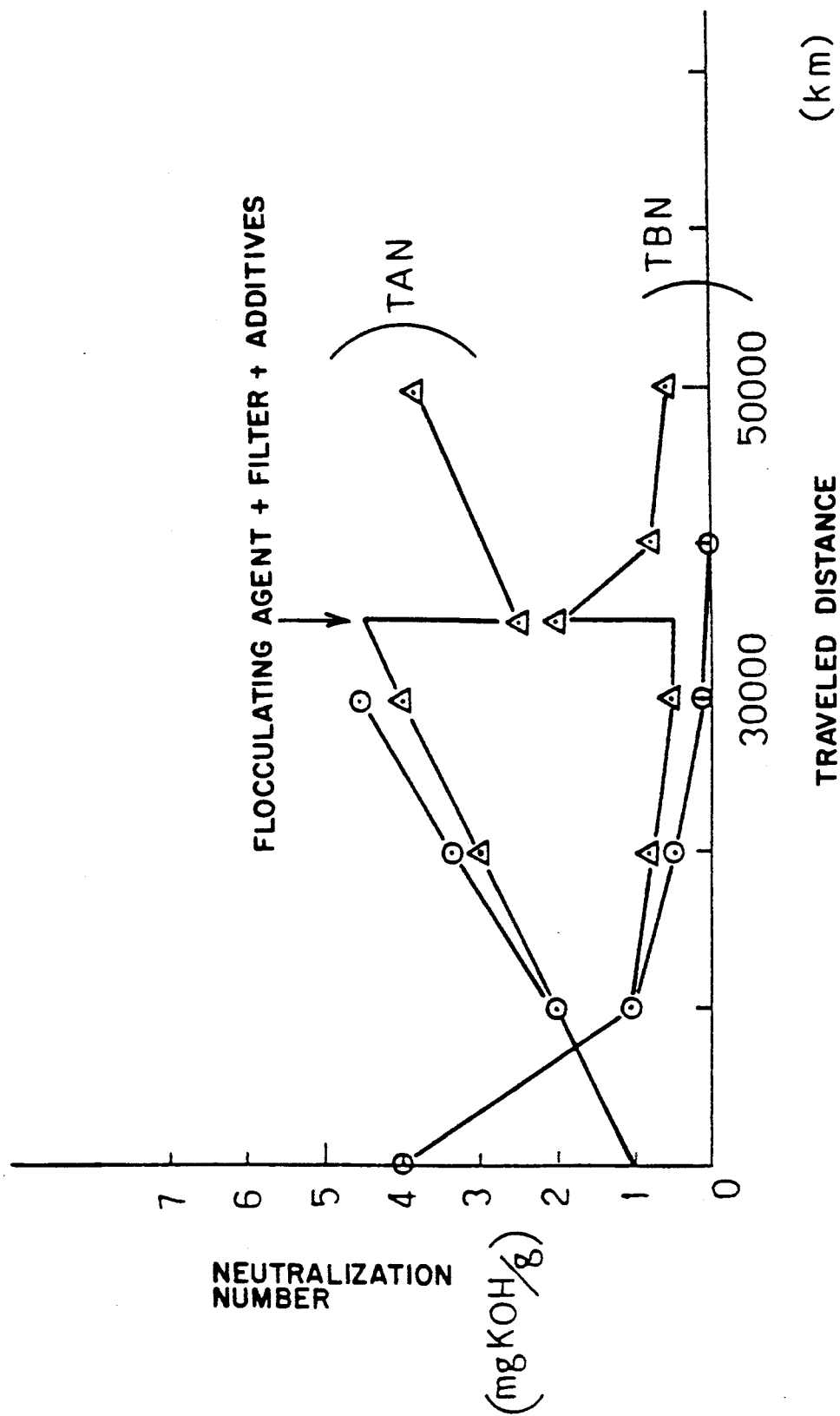
Figure 12:
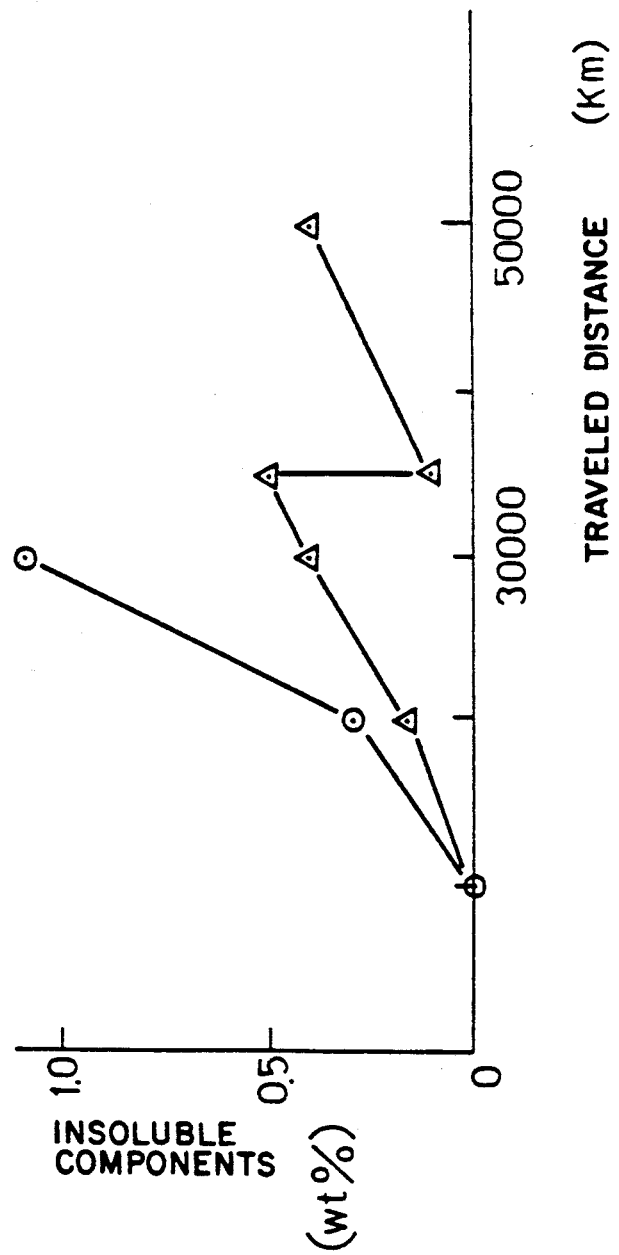

In the first embodiment, the bypass which has flocculating agent 6, flocculating agent supplying pump 7, filter 9 and adsorbent 10 is equipped to be used when insoluble components becomes greater than 0.5 wt %. When insoluble components is smaller than 0.1 wt %, this bypass started when the insoluble components gets greater than 0.5 wt % is stopped. These results are shown in FIG. 11 and FIG. 12, which show the effect of flocculating agent 6, flocculating agent supplying pump 7, filter 9 and adsorbent 10.

Figure 13:
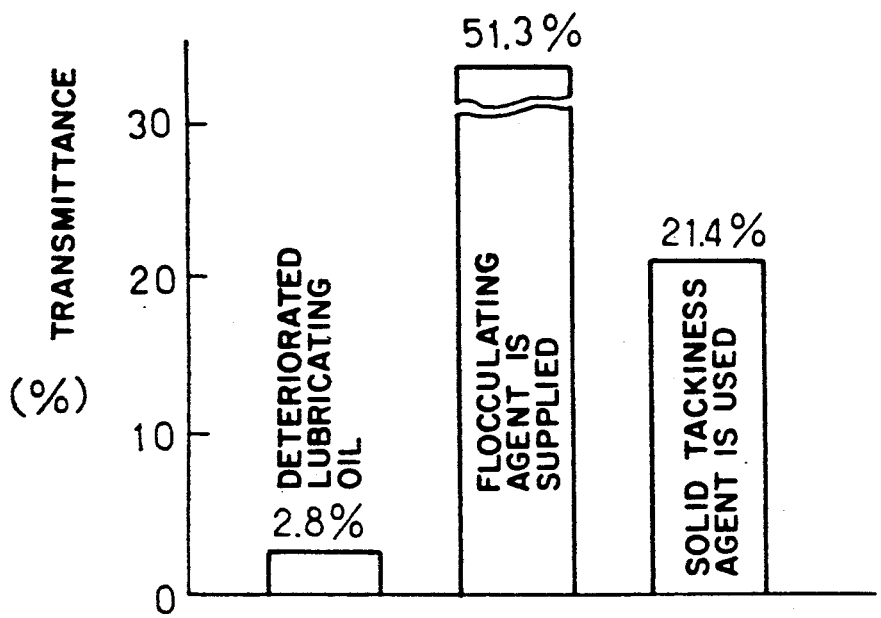
Figure 14:
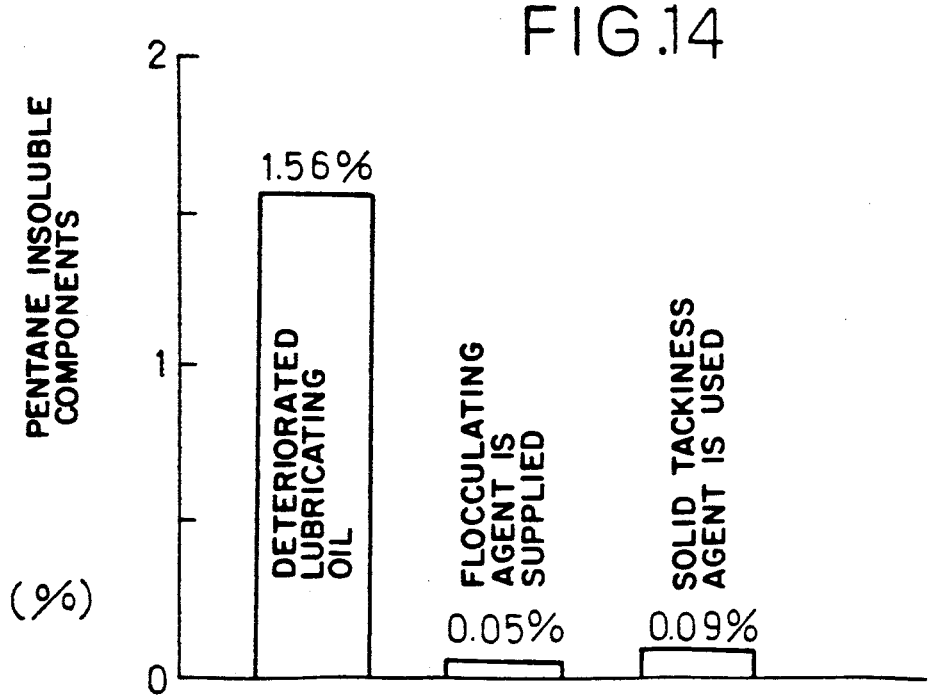

Furthermore, a next experiment was carried out to prove the effect of separating agent adding means, filtering means and adsorbing means of the first embodiment. 4 liters of deteriorated lubricating oil which was used for a gasoline engine vehicle with 7000 km run was used for this experiment. After adding N-n butyl diethanolamine as a separating agent to the deteriorated lubricating oil, insoluble components are filtered by by filter 9. The 4 liter of deteriorated lubricating oil was circurated at the rate of several cc/ minute, and the amount of N-n butyl diethanolamine is about 2% of the circuration rate of deteriorated lubricating oil. After this experiment, the transmittances of the lubricating oil and the insoluble components are shown in FIG. 13 and FIG. 14 respectively. FIG. 13 and FIG. 14 also show experimental results when a solid tackiness agent was used instead of N-n butyl diethanolamine. When CMC(carboxymethyl cellulose) is used as a solid tackiness agent, about 200 g of CMC is equipped above filter 9 instead of tank for flocculating agent 5 and flocculating agent supplying pump 7. The CMC can be attached to the surface of filter 9. The data of FIG. 13 and FIG. 14 are taken when about 20 wt % of particulate CMC is used.

In the first embodiment, the flocculating agent as a separating agent can be other flocculating agents like amine which has hydroxyl group (—OH). For example, when a solution of triethanolamine was used, the transmittence of the lubricating oil went up to 44% from 3.7%. Triisopropanolamine, diisopropanolamine or N-benzylethanolamine can be used, too.

The flocculating agent as a separating agent can be other flocculating agents like azodicarbonylamido or methacrylamid having amido(—CO—NH$_2$). When azodicarbonylamido was used, the transmittance went up to 18% from 3.7%. When methacrylamid was used, the transmittance went up to 44.7% from 3.7%.

In the first embodiment, components of additives are same as ones included in the lubricating oil, for example, a viscosity index improving agent, detergent additive, oiliness improving agent, antioxidant and defoaming agent. These components can be detergent additive, oiliness improving agent and antioxidant. Other additives can be used which have an ability of antifriction, for example. MoDTP(molybdenum dithiophosphate) and MoDTC(molybdenum dithiocarbamato).

Figure 15:
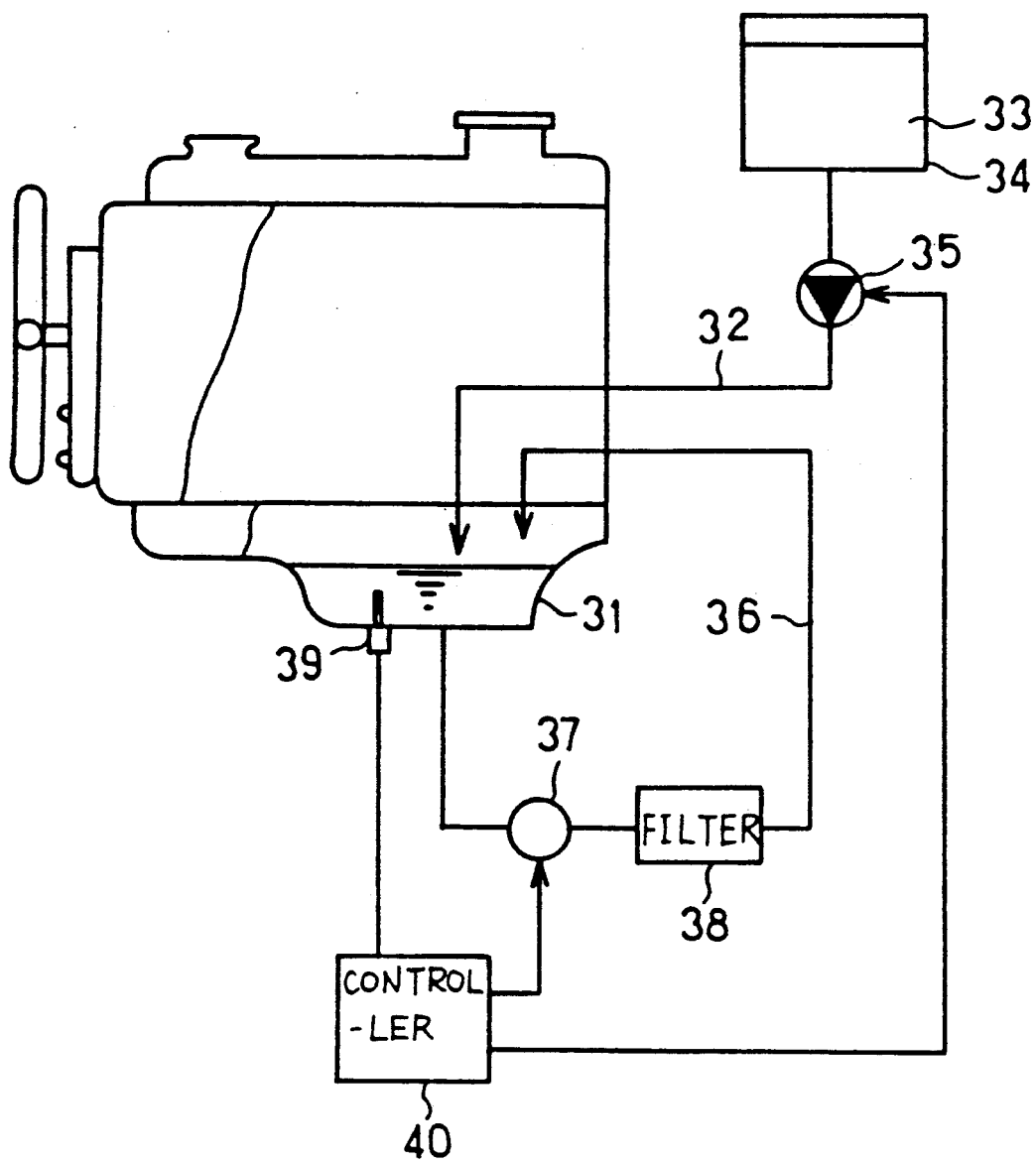
FIG. 15 is a schematic view showing the overall constraction of the second embodiment of the present invention.

The second embodiment of the present invention will be described with reference to FIG. 15. Pipe 32 is connected to oil pan 31. Tank 34 for additives having 500 cc of volume and formed of polypropylene has additive 33, and is connected to pipe 32 by additive supplying pump 35 as supplying means. Additive 33 is basic phenate(e.g. calcium phenate) diluted by lubricating oil. Pipe 36 is connected to oil pan 31 for circulating lubricating oil by circulating pump 37. Circulating pump 37 is a rotational type having a discharge capacity of 30 cc/sec driven by 12 V D.C. The circulation loop of circulating pump 37 includes filter 38 which is equipped to eliminate insoluble components in lubricating oil. Filter 38 is, for example, a particulate activated clay having 200 g of weight, 1 mm in diameter and 3~5 mm in length. Sensor 39 is equipped in oil pan 31 which is same as TBN sensor 29 in the first embodiment. Controller 40 as controlling means is connected to sensor 39, additives supplying pump 35 and circulating pump 37.

Figure 16:
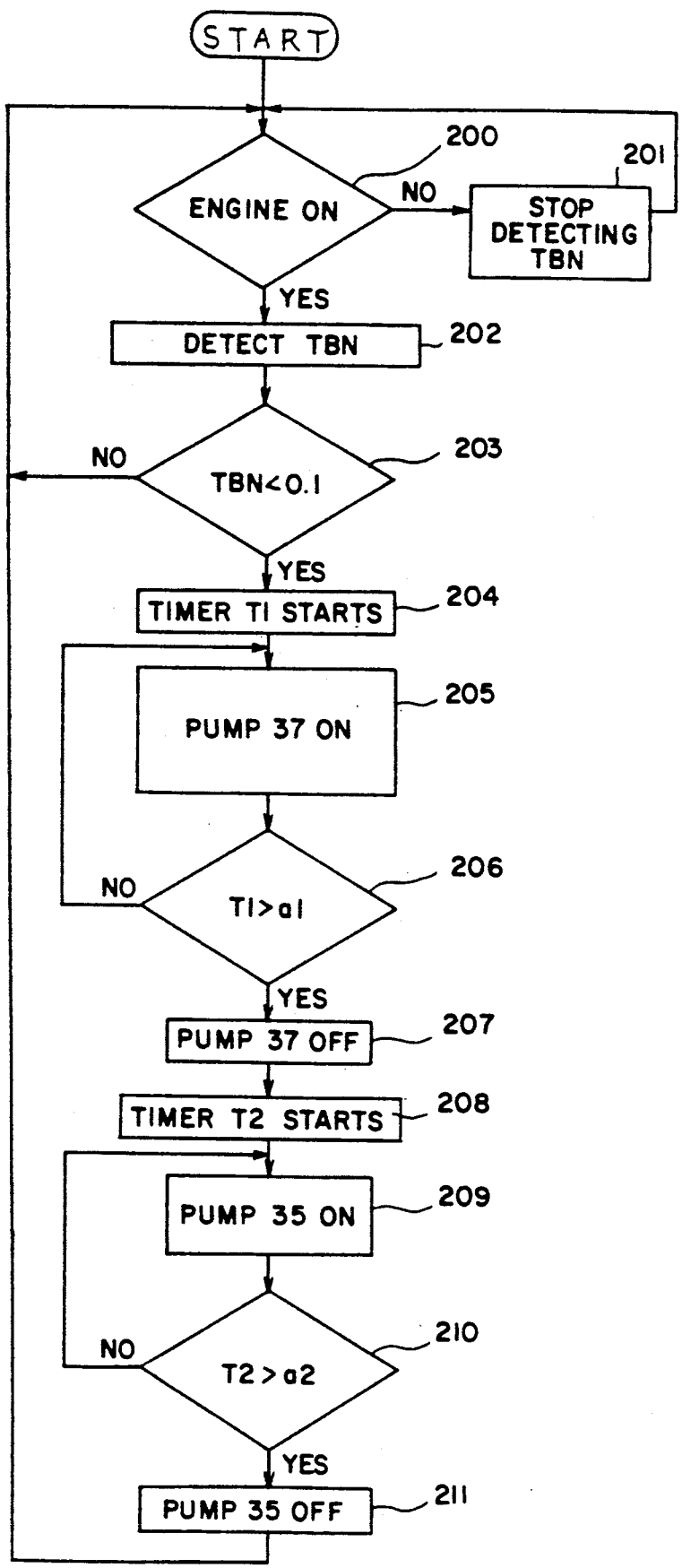
FIG. 16 shows a flow chart of the second embodiment of the present invention.

The operation of the second embodiment is described according to FIG. 16 as follows.

Step 200 determines whether the engine is driving or not by an operational signal from key switch(ignition switch). If the engine is not driving, sensor 39 stops detecting TBN. If the engine is driving, sensor 39 starts detecting TBN in a step 202. In a step 203, it is judged whether TBN is smaller than 0.1 or not. If TBN is greater than or equal to 0.1, the flow returns to step 200. If TBN is smaller than 0.1 after starting timer T1 in a step 204, circulating pump 37 is driven at a step 205. Then, time of timer T1 is compared with predetermined time a1 in a step 206. The step 205 is repeated until time of timer T1 exceeds a1. When T1 exceeds a1, circulating pump 37 is stopped in a step 207. Then timer T2 starts in a step 208. In a step 209, additives supplying pump 35 is driven by controller 40. In a step 210, time of timer T2 is compared with predetermined time a2. If T2 is not greater than a2, the step 209 is repeated. If T2 is greater than a2, additive supplying pump 35 is stopped in a step 211, then returns to the step 200.

Figure 17:
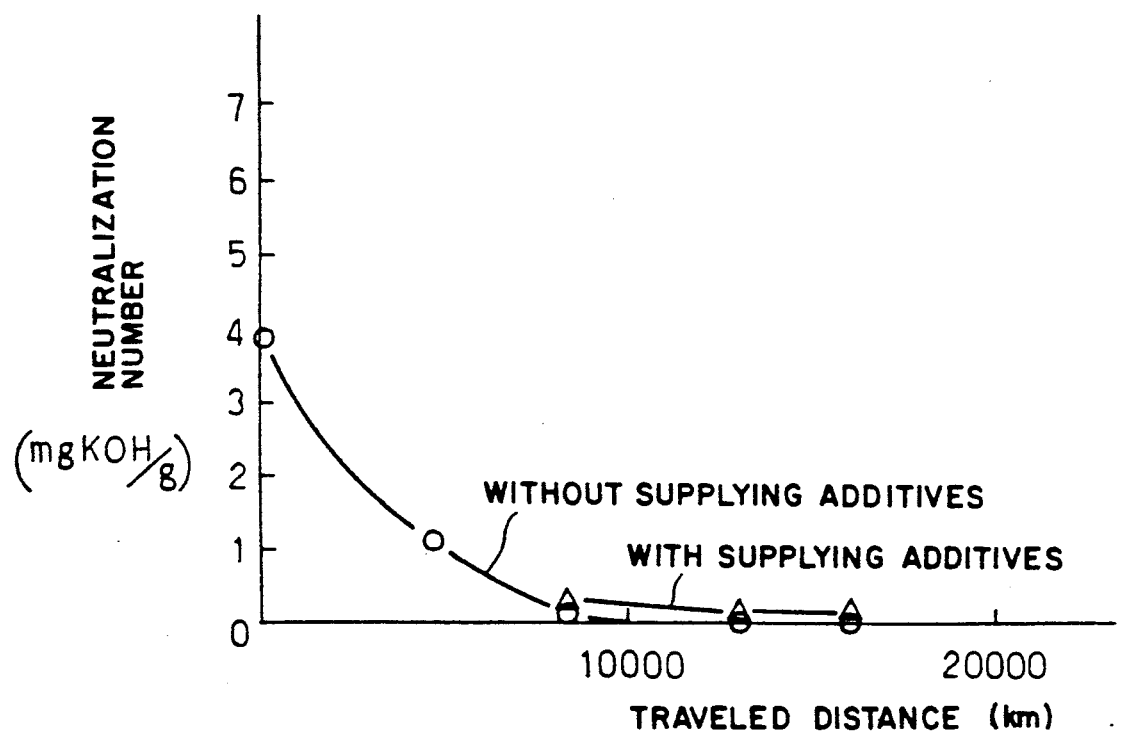
FIG. 17 and FIG. 18 are graphic views showing the experimental results to comfirm the effect of the second embodiment of the present invention.
Figure 18:
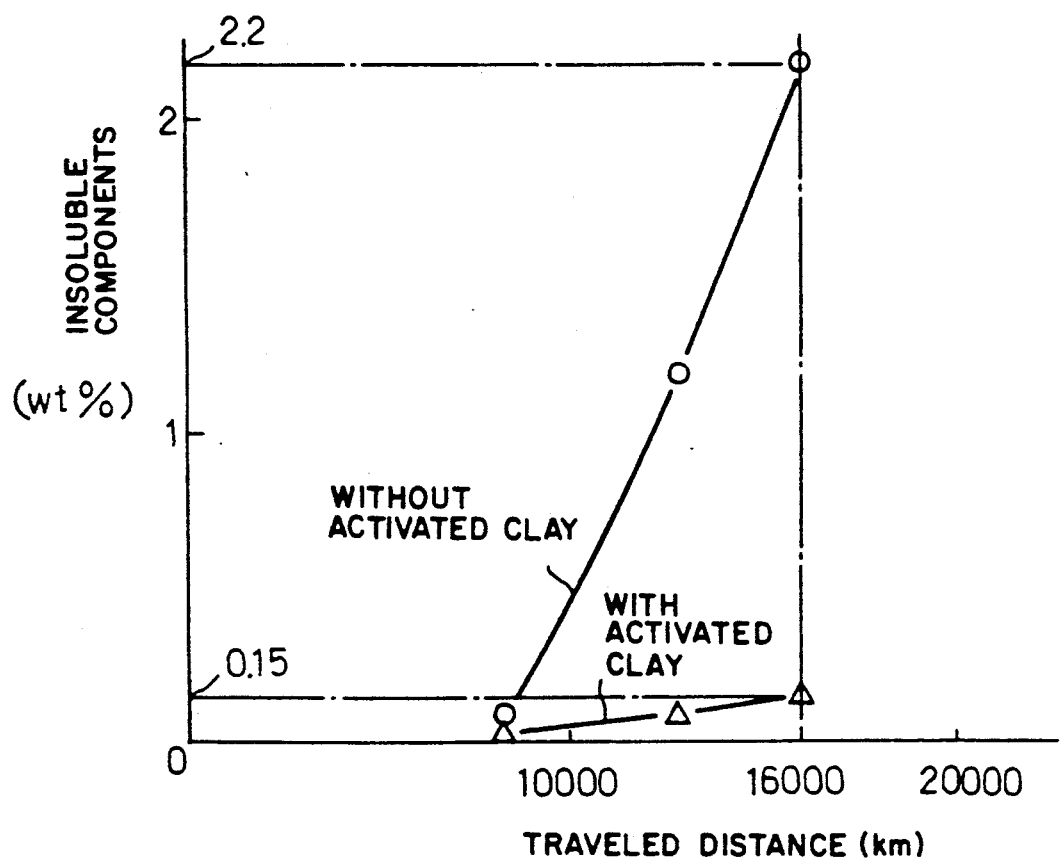

The following experiment was executed to prove the effect of the second embodiment. In this experiment, a 2000 cc engine (1GEU engine) of a gasoline car was used. First, 30 cc/sec of deteriorated lubricating oil was circulated through the filter with 200 g of activated clay when TBN was smaller than 0.1. After one circulation of the deteriorated lubricating oil, the circulation was stopped. Then 20 cc of additives which is a detergent additives(calcium phenate) diluted by lubricating oil. TBN of the 20 cc of additives is about 20. An ability to neutralize acid(neutralization number) and a condensed pentane insoluble components against running distance are shown in FIG. 17 and FIG. 18 respectively. As shown in in FIG. 18, insoluble components when the activated clay is used is reduced to 1/15 of insoluble components without using the activated clay.

As described above, filtering lubricating oil by filter 38 and supplying additives by additive supplying pump 35 were executed in the second embodiment. Though the detergent additives raise TBN, it protects against producing sludge by holding insoluble components. The detergent additives also have functions of neutralization, inhibition of producing nitrogen compounds, inhibition of polymerization of nitrogen compounds and etc.

In the second embodiment, other filters can be used instead of the activated clay, for example, an electrostatic filter which comprises fibrous filter having 10μ of porosity or porous Teflon(trade name) film having 0.1μ of porosity sandwiched by two electrodes. 3 kv of voltage is impressed between these electrodes having a distance of 2 mm.

The third embodiment of the present invention is described according to FIG. 19 and FIG. 20 as follows.

Figure 19:
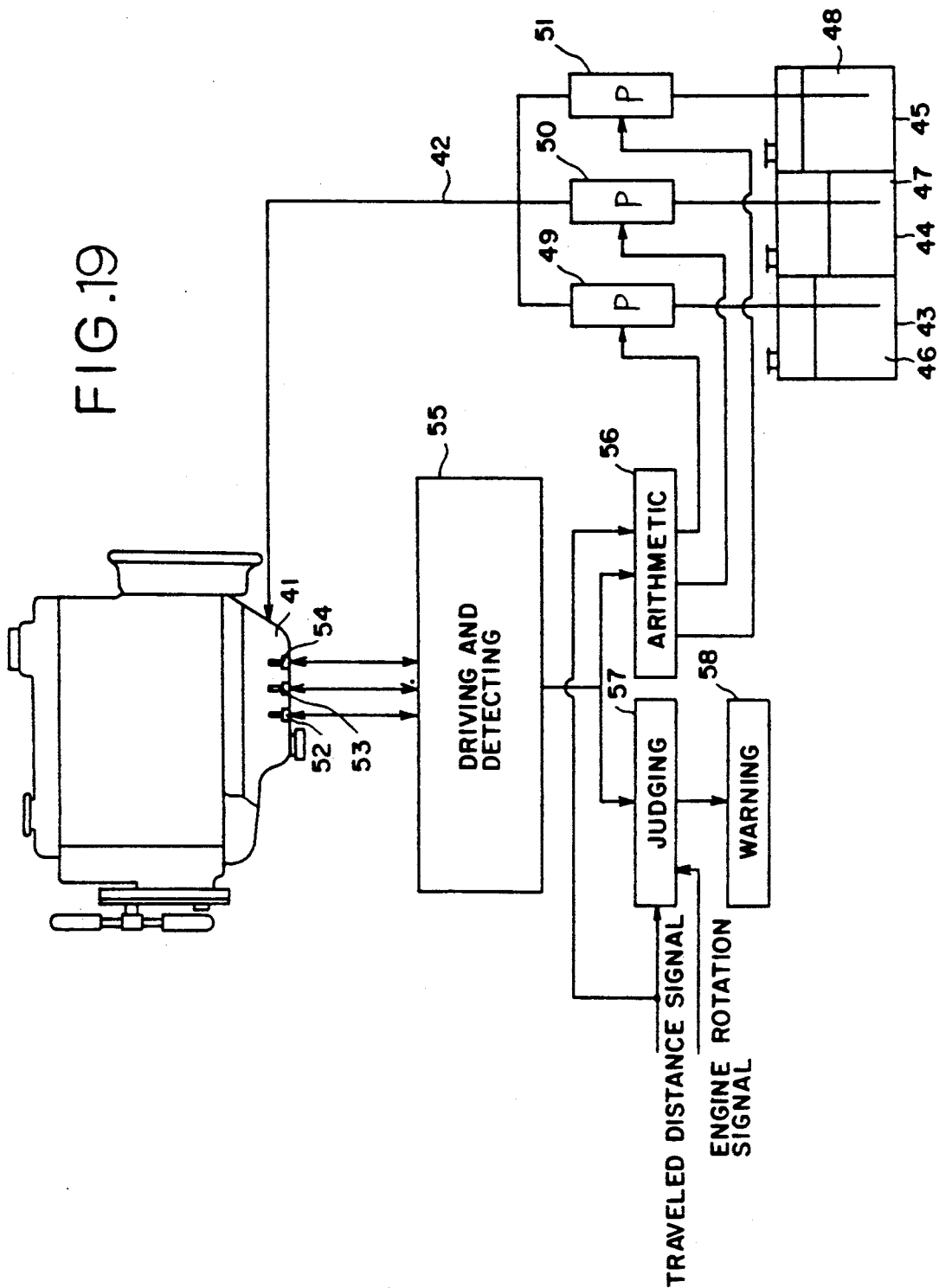
FIG. 19 is a schematic view showing the whole constraction of the third embodiment of the present invention.

FIG. 19 shows three tanks 43, 44 and 45 all connected to oil pan 41 by pipe 42. Antioxidant 46(ZnDTP etc.), basic additive 47(metallic sulfonate), and dispersing agent 48(succinimide) are kept in tanks 43, 44 and 45 respectively. Pumps 49, 50, 51 as supplying means are equipped with pipe 42 to supply antioxidant 46, basic additive 47 and dispersing agent 48 to oil pan 41.

Oil performance sensors 52, 53, 54 are equipped with oil pan 41 to detect TAN, TBN, and insoluble components respectively. Oil performance sensor 52 comprises copper thin film formed on a substrate by vaccum evaporation, and detects TAN by a resistance change produced by corrosion. Oil performance sensor 52 can be replaced by a special ion-permeable membrane to detect an ion density of H+ in an nonaqueous solution which has a linear relationship with TAN. Oil performance sensor 53 is the same as TBN sensor 29 described in the first embodiment which impresses high voltage as pulses. Oil performance sensor 54 is a pair including a light-emitting diode and a silicon photo diode, using the principle that the transmittance becomes smaller as the density of insoluble components becomes higher. Driving and detecting circuit 55 drives oil performance sensors 52, 53 and 54, and receives detecting signals from oil performance sensors 52, 53 and 54. Arithmetic circuit 56 as a controlling means receives detecting signals from oil performance sensors 52, 53 and 54 through driving and detecting circuit 55. Arithmetic circuit 56 also receives signals of running distance from a odometer(not shown in FIG. 19). Arithmetic circuit 56 drives pumps 49, 50 and 51 based on this input information. Judging circuit 57 receives detecting signals from oil performance sensors 52, 53 and 54 through driving and detecting circuit 55, and also receives signals of running distance from an odometer and signals of rotation number of an engine from an engine rotational sensor(not shown in FIG. 19). Warning lamp 58 is connected with judging circuit 57.

The operation of the third embodiment is described below with reference to FIG. 20.

Oil performance sensors 52, 53 and 54 start detecting by signals from driving and detecting circuit 55. When one of TAN, TBN and insoluble components has a level outside of predetermined regions, arithmetic circuit 56 drives pumps 49, 50 and 51 to supply antioxidant 46, basic additive 47 and dispersing agent 48. The predetermined region for TBN is between 0 and 2 of TBN. The flow mass, in other words, driving time(on-time) of pumps 49, 50 and 51 are predetermined.

In the third embodiment, antioxidant 46 is supplied to lubricating oil according to the signal of TAN detected by sensor 52. Basic additive 47(metallic sulfonate) is supplied to lubricating oil according to the signal of TBN detected by sensor 53. Dispersing agent 48(succinimide) is supplied to lubricating oil when a ratio of the density of insoluble component(increased density of insoluble components/traveled distance since the last supplying) exceeds the predetermined value. To prevent an overflow of lubricating oil. total driving time for pumps 49, 50 and 51 has a limit which is determined by estimating the amount of consumed lubricating oil from the traveled distance since the last supplying. Judging circuit 57 receives the signals from oil performance sensors 52, 53 and 54, the odometer, and the engine rotational sensor. Judging circuit 57 lights up warning lamp 58 when one of those signals exceeds the predetermined level. Judging circuit 57 stores an indication of the warning in a memory to so that it will light up again when the engine starts, even after the engine has stopped.

According to the third embodiment as described above, the life of the lubricating oil is lengthened since an adequate amount of additives are supplied according to the state of the lubricating oil.

A correction of the supplying amount of additives according to a calculation of consumed oil by detecting the work of an internal combustion engine like a temperature of lubricating oil, rotation number of an engine, a torque and etcetera can be executed.

What is claimed is:

1. An apparatus for adding additives to lubricating oil comprising:
   detecting means equipped in a circuit of flow of a lubricating oil, for impressing a high voltage between two points in said lubricating oil and measuring a current therebetween, to determine a TBN of said lubricating oil;
   supplying means for selectively supplying additives to said lubricating oil; and
   controlling means for controlling a supply of said additives by said supplying means when said TBN detected by said detecting means is outside a predetermined range.

2. An apparatus for adding additives to lubricating oil according to claim 1, wherein said controlling means controls said supplying means to keep said TBN higher than 0 and less than 2 to avoid increase of insoluble components and TAN when TBN becomes 0.

3. An apparatus for adding additives to lubricating oil according to claim 1, wherein said detecting means further includes a light emitting diode and a photodiode, both arranged adjacent said lubricating oil so as to detect a transmittance thereof, and said controlling means further controls a supply of said additives when said transmittance is outside a predetermined range.

4. An apparatus for adding additives to lubricating oil according to claim 3, wherein said controlling means controls said supplying means to keep said TBN higher than 0 and less than 2 to avoid increase of insoluble components and TAN when TBN becomes 0.

5. An apparatus for adding additives to lubricating oil according to claim 1, wherein said supplying means increases a rate of supplying said additives when said TBN is greater than a first predetermined value, and decreases a rate of said supplying when said TBN becomes less than a second predetermined value less than said first predetermined value.

6. An apparatus for adding additives to lubricating oil according to claim 5, wherein said first predetermined value is 2, and said second predetermined value is 0.5.

7. An apparatus for adding additives to lubricating oil according to claim 1, wherein said detecting means further comprises means for determining an amount of insoluble components in said oil.

8. An apparatus for adding additives to lubricating oil according to claim 7, wherein said supplying means includes a pump which turns on when said amount of insoluble components is greater than a first value and turns off when said amount of insoluble components is less than a second value lower than said value.

9. An apparatus for adding additives to lubricating oil according to claim 8, wherein said supplying means supplies 0.3 cc of said lubricating oil at a time.

10. An apparatus for adding additives to lubricating oil according to claim 1, wherein said additives includes at least one of antioxidant and detergent oil.

11. An apparatus for adding additives to lubricating oil according to claim 1, further comprising:
    separating agent supplying means for supplying separating agent to said lubricating oil, wherein said separating agent separates insoluble components from said lubricating oil;
    filtering means which is equipped in a path of said oil after said separating agent supplying means for filtering said separated insoluble components; and
    adsorbing means, equipped in a path of said oil after said filtering means for adsorbing oversupplied separating agent.

12. A method of adding additives to lubricating oil comprising the steps of:
    impressing a high voltage between two points in said lubricating oil and measuring a current therebetween, to determine a TBN of said lubricating oil; and
    supplying additives to said luburicating oil when said TBN is outside a predetermined range.

13. A method according to claim 12, wherein said supplying step includes the step of keeping said TBN higher than 0 and less than 2 to avoid increase of insoluble components and TAN when TBN becomes 0.

14. A method according to claim 12, further comprising the steps of:
    supplying separating agent to said lubricating oil, wherein said separating agent separates insoluble components from said lubricating oil;
    filtering said separated insoluble components; and
    adsorbing oversupplied separating agent.

* * * * *